(12) United States Patent
Subramanian Jayaraman et al.

(10) Patent No.: US 11,151,019 B2
(45) Date of Patent: Oct. 19, 2021

(54) METHOD AND SYSTEM FOR DYNAMICALLY TESTING A PRODUCT AND PROCESS IN A VIRTUAL TESTING ENVIRONMENT

(71) Applicant: Wipro Limited, Bangalore (IN)

(72) Inventors: Venkata Subramanian Jayaraman, Chennai (IN); Preetha Bolar, Bengaluru (IN); Vijay Kalyan Nanduri, Hyderabad (IN)

(73) Assignee: Wipro Limited, Bangalore (IN)

( * ) Notice: Subject to any disclaimer, the term of this patent is extended or adjusted under 35 U.S.C. 154(b) by 240 days.

(21) Appl. No.: 16/365,248

(22) Filed: Mar. 26, 2019

(65) Prior Publication Data

US 2020/0285565 A1  Sep. 10, 2020

(30) Foreign Application Priority Data

Mar. 7, 2019  (IN) .............................. 201941008970

(51) Int. Cl.
*G06F 9/44* (2018.01)
*G06F 9/455* (2018.01)
(Continued)

(52) U.S. Cl.
CPC .......... *G06F 11/3664* (2013.01); *G06F 11/36* (2013.01); *G06F 11/3684* (2013.01); *G06F 11/3688* (2013.01); *G06N 20/00* (2019.01)

(58) Field of Classification Search
CPC .. G06F 11/36; G06F 11/3684; G06F 11/3688; G06F 11/3664; G06N 20/00
See application file for complete search history.

(56) References Cited

U.S. PATENT DOCUMENTS 9,110,496 B1 *  8/2015  Michelsen .......... G06F 9/45558
10,073,763 B1 *  9/2018  Raman ................ G06F 11/3476
(Continued)

FOREIGN PATENT DOCUMENTS

WO  WO-2016138123 A1 *  9/2016  ............. G06F 9/455

OTHER PUBLICATIONS

Alexander Bannat, Artificial Cognition in Production Systems, 2011, pp. 148-174. http://archive.www6.in.tum.de/www6/Main/Publications/Bannat2010a.pdf (Year: 2011).*
(Continued)

*Primary Examiner* — Mongbao Nguyen
(74) *Attorney, Agent, or Firm* — Finnegan, Henderson, Farabow, Garrett & Dunner, LLP (57) ABSTRACT

Systems and methods for dynamically testing product and process of production environment in virtual testing environment are disclosed. A testing system may retrieve production data related to each production activity corresponding to events executing in real-time. Each production activity is related to product and process of production environment. Further, testing system generates each scenario of production environment in virtual testing environment in real-time, based on sequencing of each event and creates, in the virtual testing environment, virtual process and virtual product corresponding to process and product of production environment, based on at least the events, generated scenarios, and historical data. Finally, testing system re-plays each production activity in virtual testing environment for testing virtual process and virtual product. The method may comprise testing using real-time scenarios of production environment, allowing a user to view testing process and perform selective actions while testing.

15 Claims, 6 Drawing Sheets

(51) Int. Cl.
  *G06F 11/36* (2006.01)
  *G06N 20/00* (2019.01)

(56) References Cited

U.S. PATENT DOCUMENTS

| | | | | |
|---|---|---|---|---|
| 10,338,993 | B1* | 7/2019 | Lekivetz | G06F 11/0709 |
| 10,452,523 | B1* | 10/2019 | Vijayalekshmi | G06F 11/3684 |
| 10,802,948 | B2* | 10/2020 | Shanmugam | G06F 11/3684 |
| 2010/0031261 | A1* | 2/2010 | Morita | G06F 3/1224 |
| | | | | 718/100 |
| 2015/0227838 | A1* | 8/2015 | Wang | G06N 7/00 |
| | | | | 706/12 |
| 2017/0123877 | A1* | 5/2017 | Gongloor | G06F 11/3466 |
| 2018/0165184 | A1* | 6/2018 | Cochran | G06F 11/3664 |
| 2018/0239651 | A1* | 8/2018 | Gong | G06F 11/3423 |
| 2018/0341691 | A1* | 11/2018 | Ekbom | G06F 16/178 |
| 2019/0294517 | A1* | 9/2019 | Cazarez Aguilar | G06N 5/022 |
| 2020/0183806 | A1* | 6/2020 | Lin | G06F 11/3438 |

OTHER PUBLICATIONS

Christian Buchholz, Design of a Test Environment for Planning and Interaction with Virtual Production Processes, 2017, pp. 547-552. https://www.sciencedirect.com/science/article/pii/S221282711630703X (Year: 2017).*

* cited by examiner

| Production activity number | Production activity | Listed in the predefined production activities | Value of data cleaning flag | Database |
|---|---|---|---|---|
| Production activity 1 | Add items to a right tag | Yes | False | First database |
| Production activity 2 | Tag the item to the right container | Yes | False | First database |
| Production activity 3 | Capture barcode of the container | Yes | False | First database |
| Production activity 4 | Enable storing of the container to a right location | Yes | False | First database |
| Production activity 5 | Update storage location in a database | Yes | False | First database |

METHOD AND SYSTEM FOR DYNAMICALLY TESTING A PRODUCT AND PROCESS IN A VIRTUAL TESTING ENVIRONMENT

TECHNICAL FIELD

The present subject matter is related in general to the field of software testing, and more particularly, but not exclusively to method and system for dynamically testing a product and process in a virtual testing environment.

BACKGROUND

Generally, quality of products and services delivered is one of the key components of a client-vendor relationship. To ensure the quality of products developed for the clients, the products undergo a testing phase before delivering the product to the client. However, upon deployment of the product in the client environment, testing the product in the production environment may require real-time feedback from the products which is not only complex to obtain but also may disrupt working of the product, hence proving to be a non-feasible option.

Existing systems perform testing on the deployed products based on a set of predefined test data and test scenarios. However, the predefined test data and the test scenarios may be an assumed scenario approach towards testing, which may not be able to holistically cover sequence of activities that generally occur in the production environment when the products are deployed in the client environment. Therefore, the predefined test data and test scenarios cannot be used for testing different test scenarios that occur in the production environment upon deployment of the product. Even if the predefined test data and the test scenarios are used for testing different test scenarios that occur in the production environment, the test results may be incorrect, which may reduce overall testing efficiency due to usage of same test data and test scenarios continuously. Further, the existing systems do not allow a user to manipulate the test data while testing the deployed product, which does not provide a perspective regarding behaviour of the product under various conditions to a user such as how the product might work with respect to faster input, slower input, high quantity and the like.

The information disclosed in this background of the disclosure section is only for enhancement of understanding of the general background of the invention and should not be taken as an acknowledgement or any form of suggestion that this information forms the prior art already known to a person skilled in the art.

SUMMARY

One or more shortcomings of the prior art are overcome, and additional advantages are provided through the present disclosure. Additional features and advantages are realized through the techniques of the present disclosure. Other embodiments and aspects of the disclosure are described in detail herein and are considered a part of the claimed disclosure.

Disclosed herein is a method of dynamically testing a product and a process of a production environment in a virtual testing environment. The method includes retrieving, by a testing system, production data related to each of one or more production activities corresponding to one or more events executing in real-time. Each of the one or more production activities may be related to the product and the process of the production environment. Further, the method includes generating each of one or more scenarios of the production environment in the virtual testing environment in real-time, based on sequencing of each of the one or more events. Subsequently, the method includes creating, in the virtual testing environment a virtual process and a virtual product corresponding to the process and the product of the production environment, respectively, based on at least the one or more events, the generated scenarios occurring due to the events, and historical data obtained from a shared repository associated with the testing system. Finally, the method includes re-playing each of the one or more production activities in the virtual testing environment for testing the virtual process and the virtual product.

Further, the present disclosure includes a testing system for dynamically testing a product and a process of a production environment in a virtual testing environment. The testing system includes a processor and a memory communicatively coupled to the processor. The memory stores the processor-executable instructions, which, on execution, cause the processor to retrieve production data related to each of one or more production activities corresponding to one or more events executing in real-time. Each of the one or more production activities may be related to the product and the process of the production environment. Further, the processor may be configured to generate each of one or more scenarios of the production environment in the virtual testing environment in real-time, based on sequencing of each of the one or more events. Subsequently, the processor may be configured to create, in the virtual testing environment, a virtual process and a virtual product corresponding to the process and the product of the production environment, respectively, based on at least the one or more events, the generated scenarios occurring due to the events, and historical data obtained from a shared repository associated with the testing system. Finally, the processor may be configured to re-play each of the one or more production activities in the virtual testing environment for testing the virtual process and the virtual product.

Furthermore, the present disclosure includes a non-transitory computer readable medium including instructions stored thereon that when processed by at least one processor causes a testing system to perform operations including retrieving a production data related to each of one or more production activities corresponding to one or more events executing in real-time. Each of the one or more production activities are related to the product and the process of the production environment. Further, the instructions cause the processor to generate each of one or more scenarios of the production environment in the virtual testing environment in real-time, based on sequencing of each of the one or more events. Furthermore, the instructions cause the processor to create a virtual process and a virtual product corresponding to the process and the product of the production environment, respectively, based on at least the one or more events, the generated scenarios occurring due to the events, and historical data obtained from a shared repository associated with the testing system. Finally, the instructions cause the processor to re-play each of the one or more production activities in the virtual testing environment for testing the virtual process and the virtual product.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagram herein represents conceptual views of illustrative systems embodying the principles of the present subject matter. Similarly, it will be appreciated that any flow chart, flow diagram, state transition diagram, pseudo code, and the like represent various processes which may be substantially represented in computer readable medium and executed by a computer or a processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "includes", "comprising", "including" or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" or "includes . . . a" does not, without more constraints, preclude the existence of other elements or additional elements in the system or method.

The present disclosure provides a method and a system for dynamically testing a product and a process of a production environment in a virtual testing environment. As an example, the product may be Point of Sale (PoS) device and the process may be card payment. As an example, the product may be a scanner and the process may be scanning items. A testing system may retrieve production data related to each of one or more production activities corresponding to one or more events being executed in real-time, in the production environment. Each of the one or more production activities may be related to the product and the process of the production environment. Further, the testing system may sequence each of the one or more events retrieved as part of the production data. Based on the sequencing of each of the one or more events, the testing system may generate each of one or more scenarios of the production environment in the virtual testing environment in real-time. Subsequently, the testing system may create a virtual process and a virtual product corresponding to the process and the product of the production environment, in the virtual testing environment. In some embodiments, the testing system may create the virtual process and the virtual product based on at least one of the one or more events, the generated scenarios occurring due to the events, and historical data. In some embodiments, the historical data may be obtained from a shared repository associated with the testing system. Further, the testing system may re-play each of the one or more production activities in the virtual testing environment for testing the virtual process and the virtual product.

The present disclosure provides a method of dynamically testing the product and the process of the production environment, without interrupting working of the product and the process, by performing tests on recreated virtual process and virtual product in a virtual testing environment. Further, the present disclosure performs testing based on snapshot of the production data retrieved from the production environment in real-time, thereby enabling accurate and exact simulation of each interaction of the production environment, that helps in performing testing based on real-time scenarios occurring in the production environment. Further, the present disclosure facilitates performing one or more selective actions while testing such as play, pause, restart, and stop the testing of the virtual process and the virtual product. Further, the present disclosure allows the user to modify data used for testing and perform testing process, which provides the user a perspective regarding behaviour of the product under various conditions such as how the product might work with respect to faster input, slower input, high quantity and the like. This may enable the user to plan development of a more efficient version of the product.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
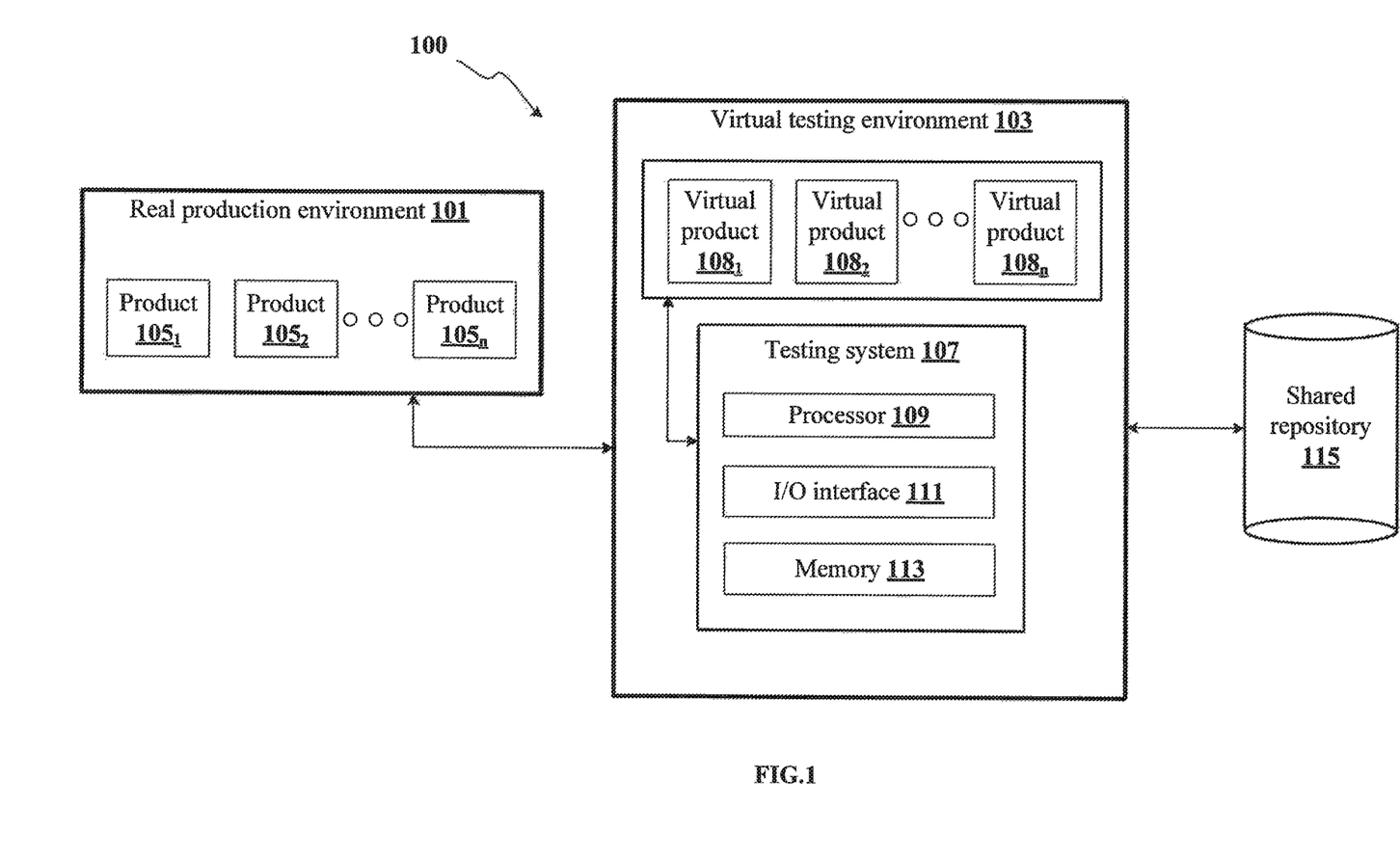
FIG. 1 shows an exemplary architecture for dynamically testing a product and a process of a production environment in a virtual testing environment in accordance with some embodiments of the present disclosure.

FIG. 1 shows an exemplary architecture for dynamically testing a product and a process of a production environment in a virtual testing environment in accordance with some embodiments of the present disclosure.

The architecture 100 includes a production environment 101, a virtual testing environment 103 and a shared repository 115. In some embodiments, the production environment 101 may include products $105_1$ to $105_n$ (also referred as products 105) that implement corresponding processes. As an example, the products 105 may be a printer implementing the corresponding process of printing data, a scanner implementing the corresponding process of scanning data/items and the like. Further, the virtual testing environment 103 may include a testing system 107 and virtual products $108_1$ to $108_n$ (also referred as virtual products 108). In some embodiments, the virtual products 108 may implement corresponding virtual processes. In some embodiments, the virtual product 108 may be a simulated version of the corresponding product 105 and the virtual processes may be a replica of the corresponding processes that are implemented in the production environment 101. The present disclosure is explained in terms of a single product 105 and a single virtual product 108 throughout the description for easy understanding. However, this should not be construed as a limitation of the present disclosure.

In some embodiments, the testing system 107 may be associated with the product 105 and the virtual product 108 via a communication network (not shown in the FIG. 1). In some embodiments, the communication network may be at least one of a wired communication network and a wireless communication network.

The testing system 107 may include a processor 109, an Input/Output (I/O) interface 111 and a memory 113. The I/O interface 111 may retrieve production data related to each of one or more production activities corresponding to one or more events executing in real-time, in the production environment 101. In some embodiments, the production data may be retrieved directly from the products 105. In some other embodiments, the production data may be retrieved from at least one of servers, computing devices and storage devices (not shown in the FIG. 1) associated with the products 105 in the production environment. As an example, the production data may include, but not limited to, names of the one or more production activities and the one or more events, identifiers (IDs) associated with the one or more production activities, time stamp associated with the one or more production activities, and quantity related to the one or more production activities. Further, the processor 109 may clean the production data i.e. may categorize the production data based on a list of predefined production activities. Upon cleaning the production data, the processor 109 may sequence each of the one or more events based on one or more of, a time stamp associated with the one or more production activities and one or more unique identifiers associated with the one or more production activities. Further, the processor 109 may generate each of one or more scenarios of the production environment in the virtual testing environment 103 in real-time, based on sequencing of each of the one or more events.

Upon generating the one or more scenarios, the processor 109 may create, in the virtual environment, the virtual process and the virtual product 108 corresponding to the process and the product 105 of the production environment 101, respectively. In some embodiments, the processor 109 may create the virtual process and the virtual product 108 based on at least, the one or more events, the generated scenarios occurring due to the events, and historical data obtained from the shared repository 115 associated with the testing system 107, via the communication network. In some embodiments, the creation of the virtual process and the virtual product may be performed in a 3-Dimensional (3D) space. Further, the processor 109 may re-play each of the one or more production activities in the virtual testing environment 103 for testing the virtual process and the virtual product 108.

In some embodiments, to re-play each of the one or more production activities, the processor 109 may provide the production data to the virtual product 108 to test the virtual product 108 and the virtual process. Upon providing the production data, the processor 109 may trigger each of one or more virtual applications sequentially to perform the corresponding one or more production activities in accordance with the production data, until the virtual process is completely simulated. In some embodiments, the one or more virtual applications may be installed in the virtual product for implementing the virtual process. In some embodiments, simulating the virtual process may include implementing the virtual process in the virtual testing environment 103 in a predefined manner. In some embodiments, the predefined manner may include accurately matching the sequence of the one or more events and timestamp associated with each of the one or more production activities, with the sequence of the one or more events and the timestamp of the one or more production activities constituting the process executed in the production environment 101.

In some embodiments, as the one or more virtual applications sequentially perform the corresponding one or more production activities, the processor 109 may receive a response from each of the one or more virtual applications sequentially. The response thus received by the processor 109 may be a test result obtained upon simulating the virtual process. In some embodiments, while testing the virtual product 108 and the virtual process, the processor 109 may facilitate one or more selective actions that may include, but not limited to, play the testing, pause the testing, restart the testing and stop the testing of the virtual process and the virtual product 108.

Figure 2A:
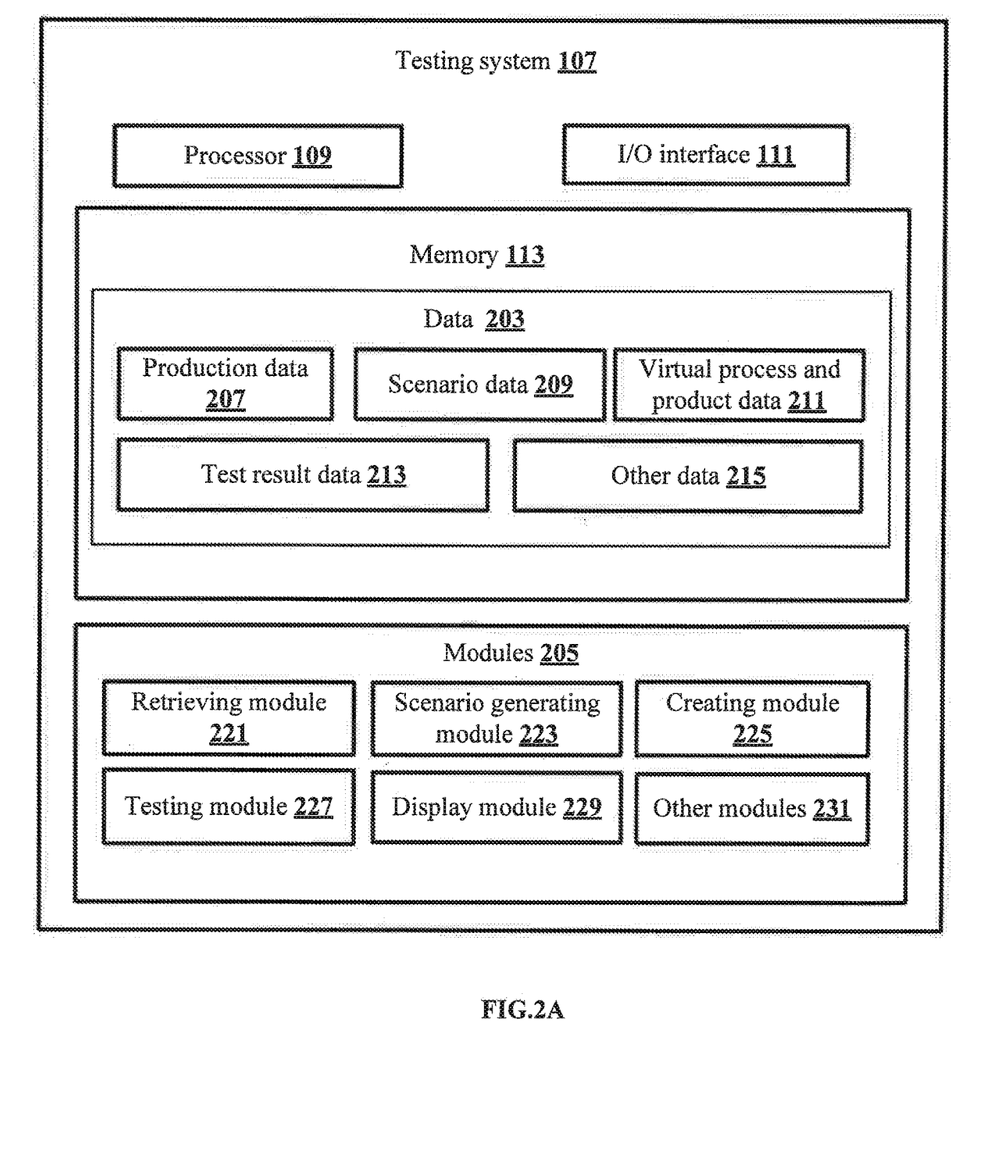
FIG. 2A shows a detailed block diagram of a testing system for dynamically testing a product and a process of a production environment in a virtual testing environment in accordance with some embodiments of the present disclosure.

FIG. 2A shows a detailed block diagram of a testing system for dynamically testing a product and a process of a production environment in a virtual testing environment in accordance with some embodiments of the present disclosure.

In some implementations, the testing system 107 may include data 203 and modules 205. As an example, the data 203 may be stored in a memory 113 configured in the testing system 107 as shown in the FIG. 2A. In one embodiment, the data 203 may include production data 207, scenario data 209, virtual process and product data 211, test result data 213 and other data 215. In the illustrated FIG. 2A, modules 205 are described herein in detail.

In some embodiments, the data 203 may be stored in the memory 113 in form of various data structures. Additionally, the data 203 can be organized using data models, such as relational or hierarchical data models. The other data 215 may store data, including temporary data and temporary files, generated by the modules 205 for performing the various functions of the testing system 107.

In some embodiments, the data 203 stored in the memory 113 may be processed by the modules 205 of the testing system 107. The modules 205 may be stored within the memory 113. In an example, the modules 205 communicatively coupled to the processor 109 configured in the testing system 107, may also be present outside the memory 113 as shown in FIG. 2A and implemented as hardware. As used herein, the term modules 205 may refer to an application specific integrated circuit (ASIC), a FPGA (Field Programmable Gate Array), an electronic circuit, a processor (shared, dedicated, or group) and memory that execute one or more software or firmware programs, a combinational logic circuit, and/or other suitable components that provide the described functionality. In some other embodiments, the modules 205 may be implemented using at least one of ASICs and FPGAs.

In some embodiments, the modules 205 may include, for example, a retrieving module 221, a scenario generating module 223, a creating module 225, a testing module 227, a display module 229 and other modules 231. The other modules 231 may be used to perform various miscellaneous functionalities of the testing system 107. It will be appreciated that such aforementioned modules 205 may be represented as a single module or a combination of different modules.

In some embodiments, the retrieving module 221 may retrieve production data 207 related to each of one or more production activities corresponding to one or more events executing in real-time. As an example, the production data 207 may include, but not limited to, names of the one or more production activities and the one or more events, identifiers (IDs) associated with the one or more production activities, time stamp associated with the one or more production activities, and quantity related to the one or more production activities. Each of the one or more production activities may be related to the product 105 and the process of the production environment 101. As an example, consider the product 105 is a barcode scanner and the process corresponding to the product 105 is to scan barcode of 10 items. The exemplary event related to the product 105 and the corresponding process may be "Successful scanning of barcode of item 1". The exemplary production activities corresponding to the exemplary event may be Add items to a right tag
Tag the item to the a right container
Capture barcode of the container
Enable storing of the container to a right location
Update storage location in a database In some embodiments, for retrieving the production data 207, the retrieving module 221 may initially obtain a snapshot of the production data 207. In some embodiments, the snapshot of the production data 207 may capture current product log of the production environment 101. Further, the retrieving module 221 may clean the production data 207 by categorizing the production data 207 based on a list of predefined production activities. In some embodiments, the retrieving module 221 may map each of the one or more production activities retrieved from the snapshot with the list of the predefined production activities. Based on the mapping, the retrieving module 221 may assign a value to a data cleaning flag associated with each of the one or more production activities. As an example, when the one or more production activities are present in list of the predefined production activities, the retrieving module 221 may set value of the corresponding data cleaning flags as "False" or "0". As an example, when the one or more production activities are to be included to the list of the predefined production activities i.e. when the one or more production activities are not present in the list of the predefined production activities, the retrieving module 221 may set value of the corresponding data cleaning flags as "True" or "1". In some embodiments, the values assigned to the data cleaning flag may be vice versa or any other value which enables the retrieving module 221 to categorize each of the one or more production activities. In some embodiments, the one or more production activities that are not present in the list of predefined production activities may be production activities that are occurring for the first time such as an error while performing the production activity.

Upon assigning the value to the data cleaning flag associated with each of the one or more production activities, the retrieving module 221 may create a copy of the production data 207 corresponding to each of the one or more production activities associated with the data cleaning flag assigned with the value "False" or "0" in a first database associated with the testing system 107. In some embodiments, the first database may be a database dedicated to store the production data 207 corresponding to each of the one or more production activities associated with the data cleaning flag assigned with the value "False" or "0". Further, the retrieving module 221 may create a copy of the production data 207 corresponding to each of the one or more production activities associated with the data cleaning flag assigned with the value "True" or "1" in a second database associated with the testing system 107. In some embodiments, the second database may be a database dedicated to store the production data 207 corresponding to each of the one or more production activities associated with the data cleaning flag assigned with the value "True" or "1". In some embodiments, the first database and the second database may be located remotely in a cloud storage environment. In some other embodiments, the first database and the second database may be locally associated with the testing system 107. Hereinafter, mention of the phrase "production data 207" may refer holistically to the production data 207 which is stored in the first database and the second database, unless specified otherwise.

Further, in some embodiments, the scenario generating module 223 may generate each of one or more scenarios of the production environment in the virtual testing environment in real-time, based on sequencing of each of the one or more events. In some embodiments, the scenario generating module 223 may initially sequence each of the one or more events based on one or more of, a time stamp associated with the one or more production activities and one or more unique identifiers (IDs) associated with the one or more production activities. In some embodiments, both the timestamp and the unique IDs associated the one or more production activities corresponding to the one or more events may be vital for the scenario generating module 223 to analyze the sequence of the one or more events. The timestamp associated with the one or more production activities may determine exact place/location where the one or more production activities occurred. The unique IDs associated with each of the one or more production activities may determine specification of the corresponding production activities. In some embodiments, the scenario generating module 223 may use any existing predefined techniques to perform sequencing based on the time stamp, the unique IDs and combination of both timestamp and unique IDs. In some embodiments, the scenario generating module 223 may generate sequence of the one or more events based on the timestamp and the unique IDs. The sequence of the one or more events thus generated may be at least one of a correct sequence, a partially correct sequence and an incorrect sequence.

In some embodiments, the sequence of the one or more events whose sequencing is accurate may be stated as the correct sequence. In some embodiments, the sequence of the one or more events whose sequencing is not completely accurate but a major part of the sequencing is accurate, may be stated as the partially correct sequence. In some embodiments, the sequence of the one or more events whose sequencing is completely inaccurate may be stated as the incorrect sequence.

Further, when the scenario generating module 223 determines the sequence of the one or more events to be the correct sequence, the scenario generating module 223 may fetch a scenario corresponding to the one or more events from a shared repository 115 associated with the testing system 107. In some embodiments, the shared repository 115 may include, but not limited to, historical data. In some embodiments, the historical data may include, but not limited to, patterns that show how a certain production activity should be performed, error patterns that were observed in previous iterations, failures that occurred due to errors in the production activities, solutions used for resolving the errors whenever the failures occurred, and scenarios generated/occurred due to the one or more events in previous iterations. Further, when the scenario generating module 223 determines the sequence of the one or more events to be the partially correct sequence, the scenario generating module 223 may perform at least one of, generating request for retransmission of production data 207 for sequencing the one or more events and ignoring the one or more events that are redundant in the sequence of the events. In some embodiments, the scenario generating module 223 may request for retransmission of the production data 207 when conditions such as incomplete availability of the production data 207, presence of improper production data, deletion of the production data 207 and the like, occur. In some embodiments, the scenario generating module 223 may ignore the one or more events when the sequence of the one or more events includes a redundant mention of the one or more events. As an example, consider an exemplary sequence of the one or more events as shown below:

Time 1, module 2, production activity 1 of event 1
Time 1, module 2, production activity 1 of event 1
Time 2, module 3, production activity 1 of event 1

In the abovementioned exemplary sequence of the one or more events, first two rows of the sequence are redundant. In such conditions, the scenario generating module 223 may ignore the one or more events. In some embodiments, irrespective of type of sequence, when the sequence includes redundant data, the scenario generating module 223 may ignore/eliminate redundancy.

Further, in some embodiments, when the scenario generating module 223 determines the sequence of the one or more events to be the incorrect sequence, the scenario generating module 223 may self-learn, using one or more pre-trained machine learning techniques, and may create data required for sequencing the one or more events. In some embodiments, the scenario generating module 223 may self-learn by analysing the historical data obtained from the shared repository 115 and the one or more production activities of the production environment, to create the data required for sequencing the one or more events. In some embodiments, the one or more events that form the incorrect sequence, may be related to the production data 207, which is stored as part of the second database. Therefore, upon generating the data required for sequencing the one or more events using the one or more pre-trained machine learning techniques, the one or more production activities corresponding to those one or more events may be updated to the list of the predefined production activities. Therefore, when the processor 109 detects the one or more production activities corresponding to the one or more events, and sequence of the events, using pre-trained machine learning techniques, based on analysis of historical data and the production data 207, the processor 109 may dynamically update the value of the data cleaning flag associated with the one or more production activities, from "True" to "False" or from "1" to "0". Further, upon updating the value of the data cleaning flag associated with the one or more production activities from "True" to "False", the processor 109 may migrate those one or more production activities from the second database to the first database.

In some embodiment, the scenario generating module 223 may perform sequencing of the one or more events, until each sequence of the one or more events is determined as the correct sequence and the scenario corresponding to the correct sequence is fetched from the shared repository 115. The sequence of the one or more events thus generated, may be stored as the scenario data 209.

In some embodiments, upon fetching the scenario corresponding to the sequence of the one or more events, the scenario generating module 223 may determine the process and the product 105 that may be involved in the scenario by analysing data flow elements in the scenario and amount of data that has changed. In some embodiments, the data may be the production data 207, data generated by sequencing the one or more events and data related to the scenario fetched based on the sequence of the one or more events. Further, the scenario generating module 223 may sequence the data according to time and slide the data to understand flow and time slicing related to the sequence of the one or more events. Subsequently, the scenario generating module 223 may gather a product log and compare with the data to ensure consistency. In some embodiments, the product log may be data related to the product 105 deployed in the production environment 101 which is initially retrieved by the retrieving module 221. Upon ensuring consistency of the data with the product log, the scenario generating module 223 may simulate the data in accordance with the flow and the time slicing to recreate each of the one or more scenarios in the virtual testing environment 103 exactly as occurred in the production environment 101. The one or more scenarios thus recreated may be stored as part of the scenario data 209.

Figure 2B:
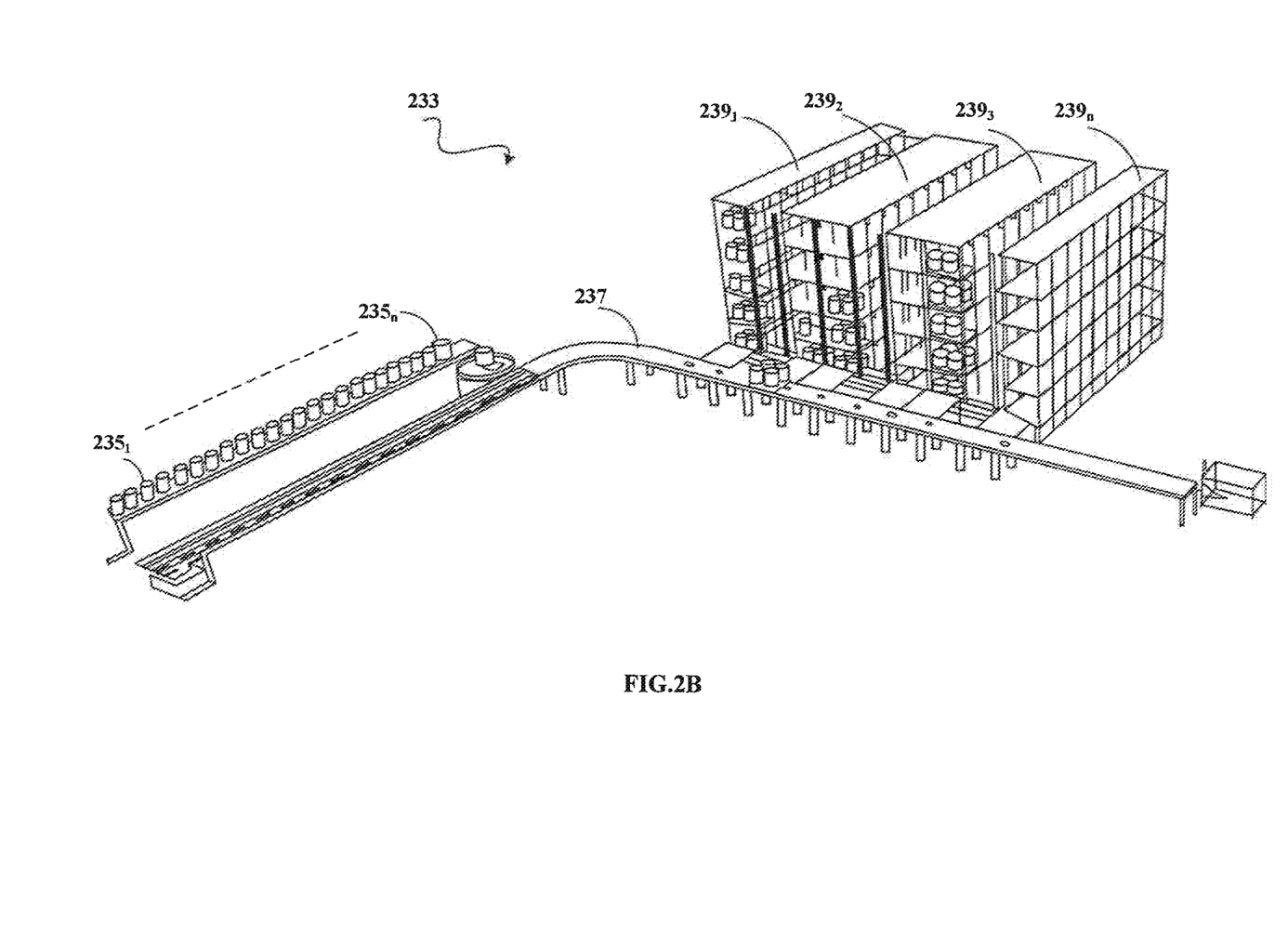
FIG. 2B shows an exemplary model of a warehouse scene replicated in a 3D space in accordance with some embodiments of the present disclosure.

Further, the creating module 225 may create in the virtual testing environment 103, a virtual process and a virtual product 108 corresponding to the process and the product 105 of the production environment 101, respectively, based on at least the one or more events, the generated scenarios occurring due to the events, and the historical data. In some embodiments, creation of the virtual process and the virtual product 108 may be performed in a 3-Dimensional (3D) space. In some embodiments, the creating module 225 may initially receive one or more images associated with the one or more production activities implemented in the production environment 101. The one or more images may include, but not limited to, one or more objects of the production environment 101. As an example, if the scene in the production environment 101 is related to a warehouse, the one or more objects may be a conveyor belt, items moving on the conveyor belt, container collecting the items, shelves to store the items and the like. In some embodiments, the one or more images may facilitate simulation of each of the one or more production activities in the virtual testing environment 103. Upon receiving the one or more images, the creating module 225 may replicate a position and a layout of each of the one or more objects present in the one or more images, in the virtual testing environment 103. FIG. 2B shows an exemplary model of a warehouse scene in production environment 101 replicated in a 3D space based on the one or more images. In the FIG. 2B, 233 indicates an exemplary warehouse, $235_1$ to $235_n$ indicate exemplary items in the exemplary warehouse 233, 237 indicates an exemplary conveyor belt to carry the items, $239_1$ to $239_n$ indicate exemplary shelves to store the items.

Further, the creating module 225 may create the virtual process based on at least the one or more events, the generated scenarios occurring due to the events, and the historical data, by implementing a messaging sequence. In some embodiments, the message sequence may occur between an intermediate layer and a 3D creation layer of the creating module 225. In some embodiments, the messaging sequence may include providing a trigger to the 3D creation layer by the intermediate layer and gather relevant data required to perform the sequence of the one or more scenarios by the 3D creation layer. In some embodiments, the creating module 225 may initially capture layout by performing time and motion analysis. Further, the creating module 225 may measure when each trigger should be initiated and a time sequence corresponding to each trigger. Subsequently, based on the trigger, the creating module 225 may gather and correlate the relevant data. In some embodiments, the relevant data may include each minute detail required for achieving an exact replica of the process in the production environment. As an example, in a warehouse scene where an item is being conveyed on a conveyor belt, the relevant data may include conveying direction, name of the item, waiting time of the item, working time of the item, storage time of the item and the like. Further, the creating module 225 may activate the messaging sequence to initiate the triggers in a manner that it creates the virtual process which is an exact replica of the process implemented in the production environment 101. In some embodiments, the creating module 225 may then create the virtual product 108 corresponding to the virtual process. As an example, when the virtual process is related to scanning, the creating module 225 may create a scanner as the virtual product 108 by simulating constructional and functional features of the scanner. In some embodiments, the creating module 225 may install one or more virtual applications in the virtual product 108 to implement the virtual process. The virtual process and the virtual product 108 thus created may be stored as the virtual process and product data 211.

Further, in some embodiments, the testing module 227 may re-play each of the one or more production activities in the virtual testing environment 103 for testing the virtual process and the virtual product 108. In some embodiments, initially, the testing module 227 may provide the production data 207 to the virtual product 108. Further, the testing module 227 may trigger each of one or more virtual applications sequentially to perform the corresponding one or more production activities in accordance with the production data 207. In some embodiments, based on the trigger, the testing module 227 may also provide one or more scenarios to be simulated and the corresponding historical data to each of the one or more virtual applications. Further, the testing module 227 may receive a response from each of the one or more virtual applications sequentially. The response thus received by the testing module 227 may be a test result obtained upon simulating the virtual process. The test result thus obtained may be stored as the test result data 213. In some embodiments, each of the one or more virtual applications may be sequentially triggered until the virtual process is completely simulated. As the testing module 227 re-plays each of the one or more production activities, a display module 229 may display a 3D view on a display device associated with the testing system 107. In some embodiments, the display module 229 may enable users to view the re-play of each of the one or more production activities, errors occurring in the virtual process, fixing of the errors in the virtual process and the like. The display module 229 may create an exact 3D scene as present in the production environment 101, based on the one or more images that are captured in the production environment 101.

In some embodiments, this 3D visualization of the testing enables the testing module 227 to facilitate users to perform one or more selective actions while testing. As an example, the one or more selective actions may include, but not limited to, play the testing, pause the testing, restart the testing and stop the testing of the virtual process and the virtual product 108. In some embodiments, the selective action "play" may allow the user to initiate the process of testing. The selective action "pause" may allow the user to halt the process of testing at any given point which may enable the user to observe in detail and draw inferences. The selective action "stop" may enable the user to terminate the process of testing at any given point of time as per requirement of the user. The selective action of "restart" may enable the user to re-initiate the process of testing at any given point of time. As an example, when the user missed to observe certain part of the testing, the user may immediately terminate the testing using the selective action "stop" and reinitiate the process of testing using the selective action "restart" to view the part missed by the user previously. In some embodiments, the testing module 227 may also facilitate the user to perform a selective action "modify", that may enable the user to alter the data provided for testing, to analyse test results under varying conditions. The one or more selective actions performed while testing, may allow the users to analyse error patterns in the virtual process.

Henceforth, the process of dynamically testing the product 105 and the process of the production environment 101 in the virtual testing environment 103 is explained with the help of one or more examples for better understanding of the present disclosure. However, the one or more examples should not be considered as limitation of the present disclosure.

Consider an exemplary warehouse scenario. As an example, consider the product 105 is a barcode scanner and the process corresponding to the product 105 is to scan barcode of 5 containers. The exemplary events related to the product 105 and the corresponding process may be "Successful scanning of barcode of container 1", "Successful scanning of barcode of container 2", "Successful scanning of barcode of container 3" and the like. The exemplary production activities corresponding to the exemplary event 1 may be:

Add items to a right tag
Tag the item to the a right container
Capture barcode of the container
Enable storing of the container to a right location
Update storage location in a database The exemplary production activities mentioned above may also be an exemplary list of predefined production activities.

Figure 2C:
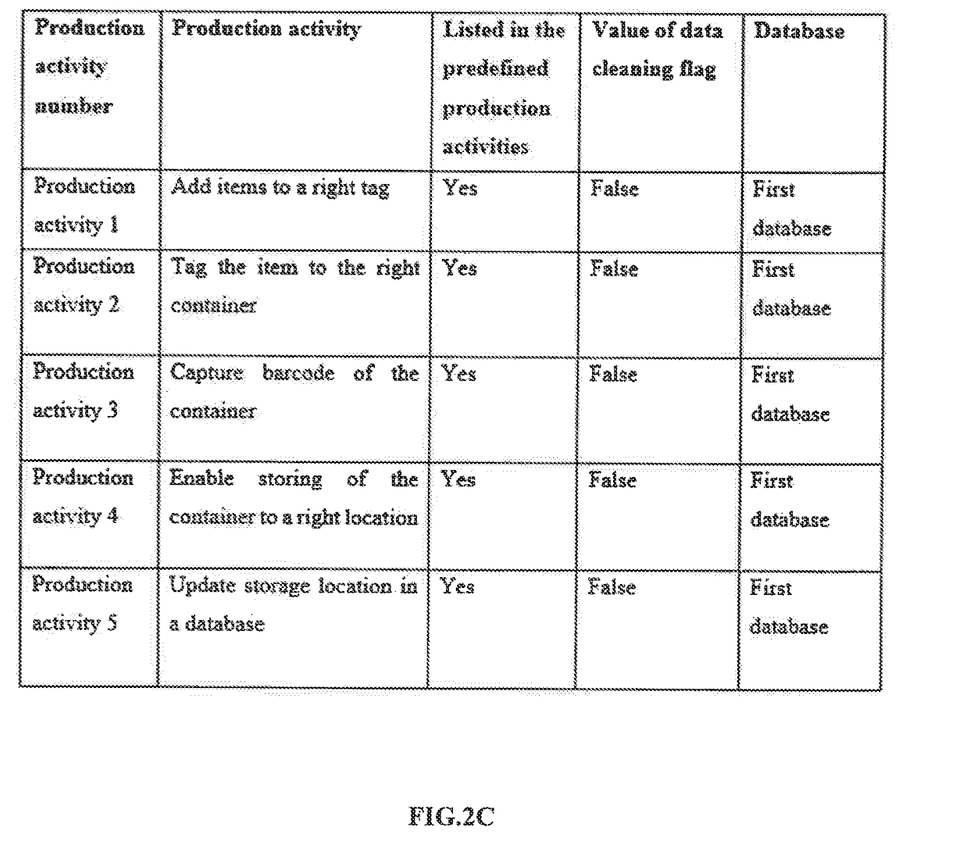
FIG. 2C shows a table of exemplary production activities in accordance with some embodiments of the present disclosure.

The processor 109 may obtain snapshot of the production data 207, which is further cleaned and validated, to obtain the production data 207 as shown in the Table of FIG. 2C.

Upon retrieving the production data 207, the processor 109 may sequence the one or more events based on the timestamp and the unique IDs associated with each production activity. An exemplary sequence of events may be as shown below:

Time 12:09:02; module 1; production activity 1 of Event 1
Time 12:09:15; module 1; production activity 2 of Event 1
Time 12:09:30; module 1; production activity 3 of Event 1
Time 12:10:01; module 2; production activity 4 of Event 1
Time 12:10:09; module 2; production activity 5 of Event 1
Time 12:10:18; module 2; production activity 5 of Event 1

In the above sequence of the events, since production activity 5 is redundant, the sequence generated is a partially correct sequence. Therefore, the processor 109 may ignore the redundant data and thereby obtain correct sequence of the events. In some embodiments, the processor 109 may retrieve a scenario corresponding to the correct sequence of the events from the shared repository 115 and recreate the scenario in accordance with the correct sequence of the events.

Further, the processor 109 may create the virtual product 108 i.e. a simulated version of the scanner in the virtual testing environment 103. The virtual product 108 may include one or more virtual applications that may implement the virtual process. In some embodiments, the processor 109 may create the virtual process based on the at least the one or more events, the generated scenario and the historical data. Further, the processor 109 may re-play each of the one or more production activities in the virtual testing environment 103 for testing the virtual process and the virtual product 108. For re-playing the one or more production activities, initially the processor 109 may trigger in the following sequence one after the other:

Virtual application 1 for performing production activity 1;
Virtual application 2 for performing production activity 2;
Virtual application 3 for performing production activity 3; and
Virtual application 4 for performing production activity 4 and 5.

Upon triggering the virtual applications in the above sequence, the processor 109 may receive a response from each of the one or more virtual applications sequentially. The response thus received by the testing module 227 is the test result obtained upon simulating the virtual process. Consider a scenario, where the user needs to observe certain part of the testing process multiple times. The user may immediately terminate the testing using the selective action "stop" and reinitiate the process of testing using the selective action "restart" to view the part desired by the user. Similarly, the user may perform selective actions such as "pause", "play", "modify" and the like.

Figure 3:
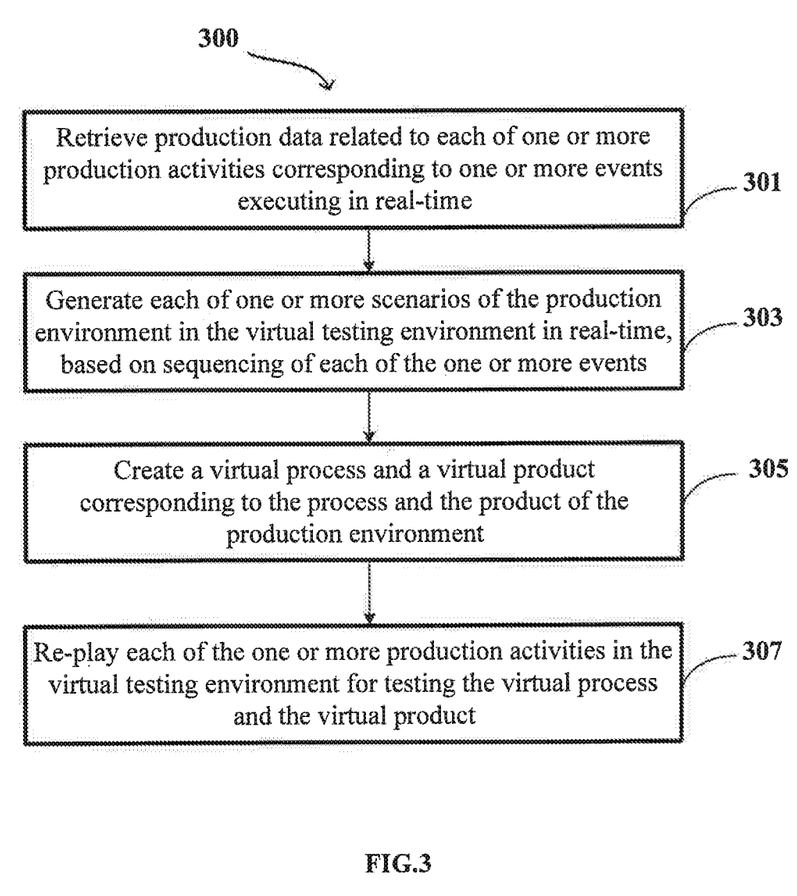
FIG. 3 shows a flowchart illustrating method of dynamically testing a product and a process of a production environment in a virtual testing environment in accordance with some embodiments of the present disclosure.

FIG. 3 shows a flowchart illustrating a method of dynamically testing a product and a process of a production environment in a virtual testing environment in accordance with some embodiments of the present disclosure.

As illustrated in FIG. 3, the method 300 includes one or more blocks illustrating a method of dynamically testing a product 105 and a process of a production environment 101 in a virtual testing environment 103. The method 300 may be described in the general context of computer-executable instructions. Generally, computer-executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include retrieving, by a processor 109 of the testing system 107, production data 207 related to each of one or more production activities corresponding to one or more events executing in real-time. In some embodiments, each of the one or more production activities are related to the product 105 and the process of the production environment 101.

At block 303, the method 300 may include generating, by the processor 109, each of one or more scenarios of the production environment 101 in the virtual testing environment 103 in real-time, based on sequencing of each of the one or more events. In some embodiments, sequence obtained upon sequencing each of the one or more events may be a correct sequence, a partially correct sequence and an incorrect sequence.

At block 305, the method 300 may include creating, in the virtual testing environment 103, by the processor 109, a virtual process and a virtual product 108 corresponding to the process and the product 105 of the production environment 101, respectively. In some embodiments, the processor 109 may create the virtual process and the virtual product 108 based on at least the one or more events, the generated scenarios occurring due to the events, and historical data obtained from a shared repository 115 associated with the testing system 107. In some embodiments, the creation of the virtual process and the virtual product 108 may be performed in a 3-Dimensional (3D) space.

At block 307, the method 300 may include re-playing, by the processor 109, each of the one or more production activities in the virtual testing environment 103 for testing the virtual process and the virtual product 108. In some embodiments, the processor 109 may facilitate a user to perform at least one selective action of play, pause, restart, and stop the testing of the virtual process and the virtual product 108.

Figure 4:
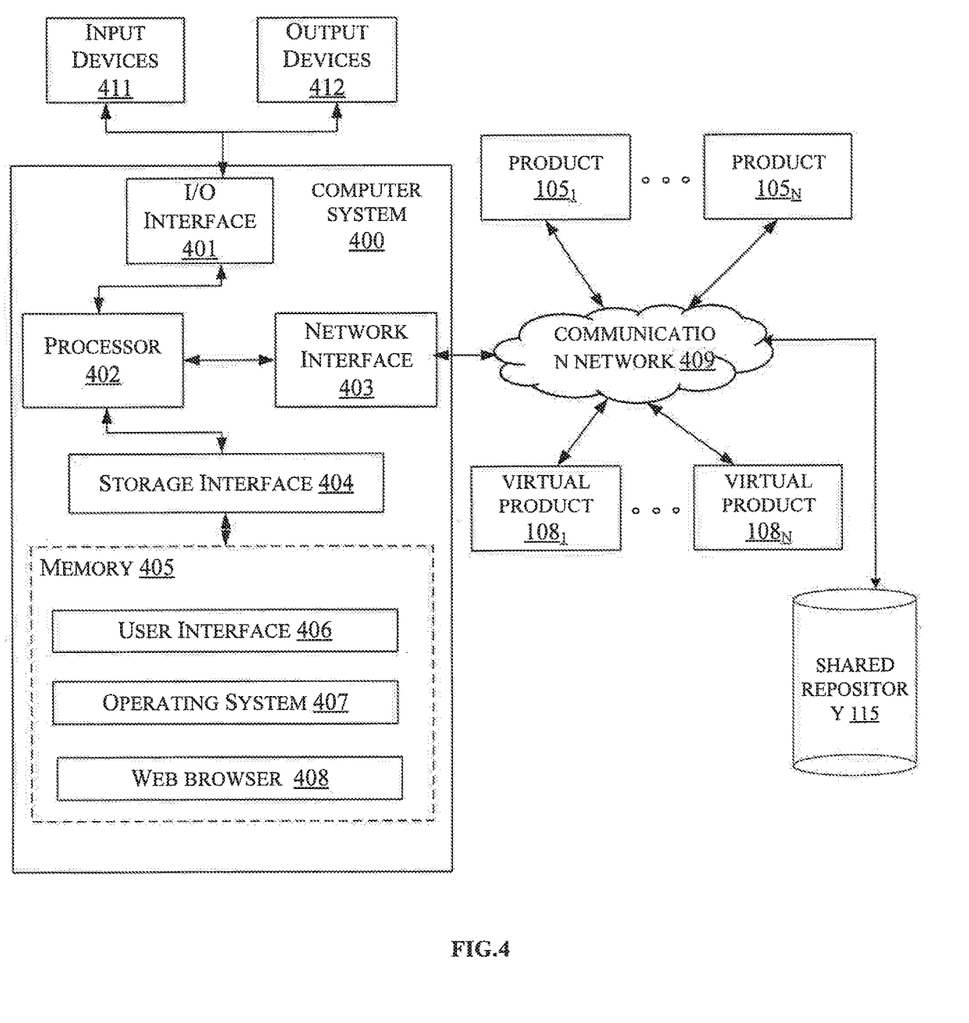
FIG. 4 is a block diagram of an exemplary computer system for implementing embodiments consistent with the present disclosure.

FIG. 4 is a block diagram of an exemplary computer system for implementing embodiments consistent with the present disclosure.

In some embodiments, FIG. 4 illustrates a block diagram of an exemplary computer system 400 for implementing embodiments consistent with the present invention. In some embodiments, the computer system 400 can be testing system 107 that is used for dynamically testing a product 105 and a process of a production environment 101 in a virtual testing environment 103. The computer system 400 may include a central processing unit ("CPU" or "processor") 402. The processor 402 may include at least one data processor for executing program components for executing user or system-generated business processes. A user may include a person, a person using a device such as those included in this invention, or such a device itself. The processor 402 may include specialized processing units such as integrated system (bus) controllers, memory management control units, floating point units, graphics processing units, digital signal processing units, etc.

The processor 402 may be disposed in communication with input devices 411 and output devices 412 via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, the computer system 400 may communicate with the input devices 411 and the output devices 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with products 105 (105$_1$ up to 105$_n$), virtual products 108 (108$_1$ up to 108$_n$) and a shared repository 115. The communication network 409 can be implemented as one of the different types of networks, such as intranet or Local Area Network (LAN), Closed Area Network (CAN) and such. The communication network 409 may either be a dedicated network or a shared network, which represents an association of the different types of networks that use a variety of protocols, for example, Hypertext Transfer Protocol (HTTP), CAN Protocol, Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like. The User interface 406 may facilitate display, execution, interaction, manipulation, or operation of program components through textual or graphical facilities. For example, user interfaces may provide computer interaction interface elements on a display system operatively connected to the computer system 400, such as cursors, icons, checkboxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, Javascrip®, AJAX, HTML, Adobe® Flash®, etc.), or the like.

In some embodiments, the computer system 400 may implement the web browser 408 stored program components. The web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for dynamically testing a product and a process of a production environment in a virtual testing environment. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

REFERRAL NUMERALS

| Reference Number | Description |
| --- | --- |
| 100 | Architecture |
| 101 | Real production environment |
| 103 | Virtual testing environment |
| 105 | Product |
| 107 | Testing system |
| 108 | Virtual product |
| 109 | Processor |
| 111 | I/O interface |
| 113 | Memory |
| 115 | Shared repository |
| 203 | Data |
| 205 | Modules |
| 207 | Production data |
| 209 | Scenario data |
| 211 | Virtual process and product data |
| 213 | Test result data |
| 215 | Other data |
| 221 | Retrieving module |
| 223 | Scenario generating module |
| 225 | Creating module |
| 227 | Testing module |
| 229 | Display module |
| 231 | Other modules |
| 233 | Exemplary warehouse |
| 235 | Exemplary items in an exemplary warehouse |
| 237 | Exemplary conveyor belt |
| 239 | Exemplary shelves |
| 400 | Exemplary computer system |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User interface |
| 407 | Operating system |
| 408 | Web browser |
| 409 | Communication network |
| 411 | Input devices |
| 412 | Output devices |

What is claimed is:

1. A testing system for dynamically testing a product and a process of a production environment in a virtual testing environment, the testing system comprises:

a processor; and a memory communicatively coupled to the processor, wherein the memory stores processor-executable instructions, which, on execution, causes the processor to:

retrieve production data related to each of one or more production activities corresponding to one or more events executing in real-time, wherein each of the one or more production activities are related to the product and the process of the production environment;

generate each of one or more scenarios of the production environment in the virtual testing environment in real-time, based on sequencing of each of the one or more events, wherein the sequencing of the one or more events is iteratively performed until a correct sequence is obtained, and wherein obtaining the correctness of the sequence comprises determining if the one or more events are present in a list of predefined production activities;

create, in the virtual testing environment, a virtual process and a virtual product corresponding to the process and the product of the production environment, respectively, based on at least the one or more events, the generated one or more scenarios occurring due to the one or more events, and historical data obtained from a shared repository associated with the testing system; and re-play each of the one or more production activities in the virtual testing environment for testing the virtual process and the virtual product, wherein to retrieve the production data from the production environment in the real-time, the processor is configured to:

obtain a snapshot of the production data;

assign a value to a data cleaning flag associated with each of the one or more production activities, wherein the value is set as "False" for each of the one or more production activities that are present in the list of predefined production activities, and the value is set as "True" for each of the one or more production activities that are to be included to the list of the predefined production activities; and create a copy of the production data corresponding to each of the one or more production activities associated with the data cleaning flag assigned with the value "False" in a first database associated with the testing system and the production data corresponding to each of the one or more production activities associated with the data cleaning flag assigned with the value "True" in a second database associated with the testing system;

wherein the processor is further configured to update, dynamically, the value of the data cleaning flag associated with the one or more production activities from "True" to "False", when the processor detects the one or more production activities corresponding to the one or more events, and the sequence of the one or more events, using pre-trained machine learning techniques, based on analysis of historical data obtained from a shared repository associated with the testing system and the production data;

wherein the processor is further configured to migrate the one or more production activities from the second database to the first database upon updating the value of the data cleaning flag associated with the one or more production activities from "True" to "False", wherein the first database comprises production data corresponding to each of the one or more production activities associated with the data cleaning flag assigned with the value "False" and the second database comprises production data corresponding to each of the one or more production activities associated with the data cleaning flag assigned with the value "True"; and wherein the processor is further configured to dynamically test the product and the process of the production environment without interrupting working of the product and the process by performing tests on recreated virtual process and virtual product in the virtual testing environment.

2. The testing system as claimed in claim 1, wherein the production data comprises names of the one or more production activities and the one or more events, identifiers (IDs) associated with the one or more production activities, time stamp associated with the one or more production activities, and quantity related to the one or more production activities.

3. The testing system as claimed in claim 1, wherein the processor performs the sequencing of the one or more events based on one or more of: a time stamp associated with the one or more production activities and one or more unique identifiers associated with the one or more production activities, wherein the sequence of the one or more events comprises at least one of the correct sequence, a partially correct sequence and an incorrect sequence.

4. The testing system as claimed in claim 3, wherein, when the processor determines the sequence of the one or more events to be the correct sequence, the processor fetches a scenario corresponding to the one or more events from the shared repository associated with the testing system.

5. The testing system as claimed in claim 3, wherein, when the processor determines the sequence of the one or more events to be the partially correct sequence, the processor performs at least one of, generating request for retransmission of production data for the sequencing the one or more events and ignoring the one or more events that are redundant in the sequence of the one or more events; and when the processor determines the sequence of the one or more events to be the incorrect sequence, the processor self-learns by analyzing historical data obtained from a shared repository associated with the testing system and the one or more production activities of the production environment, and creates data required for the sequencing the one or more events.

6. The testing system as claimed in claim 1, wherein to create the virtual process and the virtual product, the processor is configured to:

receive one or more images associated with the one or more production activities implemented in the production environment, wherein the one or more images comprise one or more objects, and wherein the one or more images facilitate simulation of each of the one or more production activities in the virtual testing environment; and replicate a position and a layout of each of the one or more objects present in the one or more images, in the virtual testing environment.

7. The testing system as claimed in claim 1, wherein for testing, the processor is configured to:

provide the production data to the virtual product;

trigger each of one or more virtual applications sequentially to perform the corresponding one or more production activities in accordance with the production data, until the virtual process is completely simulated, wherein the one or more virtual applications are installed in the virtual product for implementing the virtual process; and receive a response from each of the one or more virtual applications sequentially, wherein each response is a test result obtained upon simulating the virtual process.

8. The testing system as claimed in claim 1, further comprising facilitating at least one selective action of play, pause, restart, and stop the testing of the virtual process and the virtual product.

9. A method of dynamically testing a product and a process of a production environment in a virtual testing environment, the method comprising:

retrieving, by a testing system, production data related to each of one or more production activities corresponding to one or more events executing in real-time, wherein each of the one or more production activities are related to the product and the process of the production environment;

generating, by the testing system, each of one or more scenarios of the production environment in the virtual testing environment in real-time, based on sequencing of each of the one or more events, wherein the sequencing of the one or more events is iteratively performed until a correct sequence is obtained, and wherein obtaining the correctness of the sequence comprises determining if the one or more events are present in a list of predefined production activities;

creating, in the virtual testing environment, by the testing system, a virtual process and a virtual product corresponding to the process and the product of the production environment, respectively, based on at least the one or more events, the generated one or more scenarios occurring due to the one or more events, and historical data obtained from a shared repository associated with the testing system; and re-playing, by the testing system, each of the one or more production activities in the virtual testing environment for testing the virtual process and the virtual product, wherein to retrieve the production data from the production environment in the real-time, the processor is configured to:

obtain a snapshot of the production data;

assign a value to a data cleaning flag associated with each of the one or more production activities, wherein the value is set as "False" for each of the one or more production activities that are present in the list of predefined production activities, and the value is set as "True" for each of the one or more production activities that are to be included to the list of the predefined production activities; and create a copy of the production data corresponding to each of the one or more production activities associated with the data cleaning flag assigned with the value "False" in a first database associated with the testing system and the production data corresponding to each of the one or more production activities associated with the data cleaning flag assigned with the value "True" in a second database associated with the testing system;

wherein the processor is further configured to update, dynamically, the value of the data cleaning flag associated with the one or more production activities from "True" to "False", when the processor detects the one or more production activities corresponding to the one or more events, and the sequence of the one or more events, using pre-trained machine learning techniques, based on analysis of historical data obtained from a shared repository associated with the testing system and the production data;

wherein the processor is further configured to migrate the one or more production activities from the second database to the first database upon updating the value of the data cleaning flag associated with the one or more production activities from "True" to "False", wherein the first database comprises production data corresponding to each of the one or more production activities associated with the data cleaning flag assigned with the value "False" and the second database comprises production data corresponding to each of the one or more production activities associated with the data cleaning flag assigned with the value "True"; and wherein the processor is further configured to dynamically test the product and the process of the production environment without interrupting working of the product and the process by performing tests on recreated virtual process and virtual product in the virtual testing environment.

10. The method as claimed in claim 9, wherein the sequencing of the one or more events is performed based on one or more of: a time stamp associated with the one or more production activities and one or more unique identifiers associated with the one or more production activities, wherein the sequence of the one or more events comprises at least one of the correct sequence, a partially correct sequence and an incorrect sequence.

11. The method as claimed in claim 10, wherein, upon determination of the sequence of the one or more events to be the correct sequence, fetching a scenario corresponding to the one or more events from the shared repository associated with the testing system.

12. The method as claimed in claim 10, wherein, upon determination of the sequence of the one or more events to be the partially correct sequence, performing at least one of, generating request for retransmission of production data for the sequencing the one or more events and ignoring the one or more events that are redundant in the sequence of the one or more events; and upon determination of the sequence of the one or more events to be the incorrect sequence, performing self-learning by analyzing historical data obtained from a shared repository associated with the testing system and the one or more production activities of the production environment, and creates data required for the sequencing the one or more events.

13. The method as claimed in claim 9, wherein the virtual process and the virtual product are created by:

receiving one or more images associated with the one or more production activities implemented in the production environment, wherein the one or more images comprise one or more objects, and wherein the one or more images facilitate simulation of each of the one or more production activities in the virtual testing environment; and replicating a position and a layout of each of the one or more objects present in the one or more images, in the virtual testing environment.

14. The method as claimed in claim 9, wherein the testing is performed by:

providing the production data to the virtual product;

triggering each of one or more virtual applications sequentially to perform the corresponding one or more production activities in accordance with the production data, until the virtual process is completely simulated, wherein the one or more virtual applications are installed in the virtual product for implementing the virtual process; and receiving a response from each of the one or more virtual applications sequentially, wherein each response is a test result obtained upon simulating the virtual process.

15. A non-transitory computer readable medium for dynamically testing a product and a process of a production environment in a virtual testing environment, having stored thereon one or more instructions that when processed by at least one processor causes a testing system to perform operations comprising:

retrieving production data related to each of one or more production activities corresponding to one or more events executing in real-time, wherein each of the one or more production activities are related to the product and the process of the production environment;

generating each of one or more scenarios of the production environment in the virtual testing environment in real-time, based on sequencing of each of the one or more events, wherein the sequencing of the one or more events is iteratively performed until a correct sequence is obtained, and wherein obtaining the correctness of the sequence comprises determining if the one or more events are present in a list of predefined production activities;

creating a virtual process and a virtual product corresponding to the process and the product of the production environment, respectively, based on at least the one or more events, the generated one or more scenarios occurring due to the one or more events, and historical data obtained from a shared repository associated with the testing system; and re-playing each of the one or more production activities in the virtual testing environment for testing the virtual process and the virtual product, wherein to retrieve the production data from the production environment in the real-time, the processor is configured to:

obtain a snapshot of the production data;

assign a value to a data cleaning flag associated with each of the one or more production activities, wherein the value is set as "False" for each of the one or more production activities that are present in the list of predefined production activities, and the value is set as "True" for each of the one or more production activities that are to be included to the list of the predefined production activities; and create a copy of the production data corresponding to each of the one or more production activities associated with the data cleaning flag assigned with the value "False" in a first database associated with the testing system and the production data corresponding to each of the one or more production activities associated with the data cleaning flag assigned with the value "True" in a second database associated with the testing system;

wherein the processor is further configured to update, dynamically, the value of the data cleaning flag associated with the one or more production activities from "True" to "False", when the processor detects the one or more production activities corresponding to the one or more events, and the sequence of the one or more events, using pre-trained machine learning techniques, based on analysis of historical data obtained from a shared repository associated with the testing system and the production data;

wherein the processor is further configured to migrate the one or more production activities from the second database to the first database upon updating the value of the data cleaning flag associated with the one or more production activities from "True" to "False", wherein the first database comprises production data corresponding to each of the one or more production activities associated with the data cleaning flag assigned with the value "False" and the second database comprises production data corresponding to each of the one or more production activities associated with the data cleaning flag assigned with the value "True"; and wherein the processor is further configured to dynamically test the product and the process of the production environment without interrupting working of the product and the process by performing tests on recreated virtual process and virtual product in the virtual testing environment.

* * * * *